United States Patent [19]

Machida et al.

[11] Patent Number: 5,012,909
[45] Date of Patent: May 7, 1991

[54] CHANGE-SPEED CONTROL CONSTRUCTION

[75] Inventors: Satoshi Machida; Akio Hattori, both of Osaka, Japan

[73] Assignee: Kubota Ltd., Osaka, Japan

[21] Appl. No.: 423,765

[22] Filed: Oct. 18, 1989

[30] Foreign Application Priority Data

| Jan. 26, 1989 | [JP] | Japan | 1-19311 |
| Jan. 27, 1989 | [JP] | Japan | 1-18290 |
| Jan. 27, 1989 | [JP] | Japan | 1-18291 |

[51] Int. Cl.$^5$ .......................................... F16D 25/14
[52] U.S. Cl. .......................... 192/3.57; 192/0.08
[58] Field of Search ............... 192/0.08, 3.57, 3.61, 192/3.63

[56] References Cited

U.S. PATENT DOCUMENTS

| 2,575,277 | 11/1951 | Johnson | 192/0.08 |
| 2,955,691 | 10/1960 | Brueder | 192/3.57 |
| 3,137,311 | 6/1964 | Rohweder et al. | 192/3.57 |
| 3,386,543 | 6/1968 | Osburn | 192/3.57 |
| 3,459,285 | 8/1969 | Camburn et al. | 192/3.57 |
| 4,719,812 | 1/1988 | Machida et al. | 74/606 R |
| 4,724,727 | 2/1988 | Shibayama et al. | 74/867 |

Primary Examiner—Leslie A. Braun
Assistant Examiner—Nicholas Whitelaw
Attorney, Agent, or Firm—Gifford, Groh, Sprinkle, Patmore and Anderson

[57] ABSTRACT

A vehicle change-speed control construction for selectively engaging and disengaging a hydraulic clutch of a propelling transmission system according to a change-speed operation. Through maximum simplification and rationalization, the construction has a hydraulic control system comprised of minimized number of components consisting essentially of one pilot pressure controlled selector valve and a plurality of check valves operable in response to a change-speed operation. The improved construction is extremely simple and economical, yet achieves higher operational efficiency without transmission delay.

11 Claims, 7 Drawing Sheets

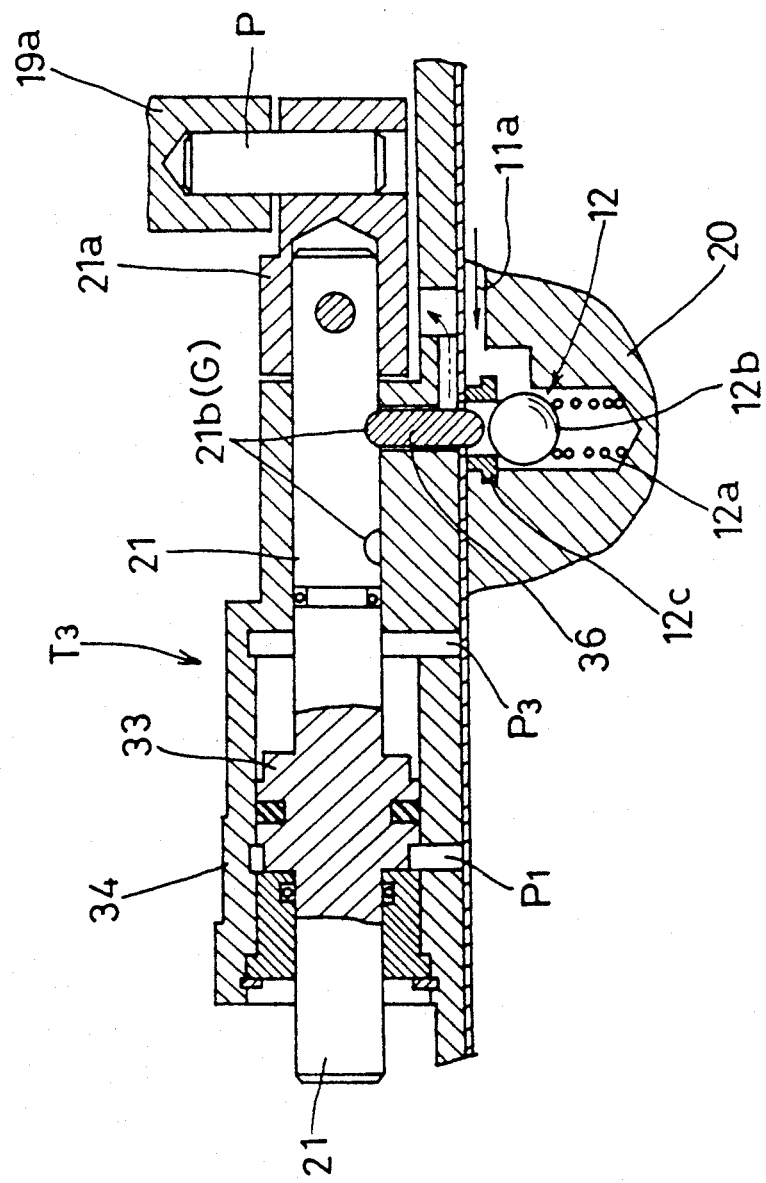

CHANGE-SPEED CONTROL CONSTRUCTION

BACKGROUND OF THE INVENTION

1. Field of the Invention

The present invention relates to a change-speed control construction, and more particularly to an improvement of a change-speed construction including a hydraulic clutch for a propelling transmission system and a hydraulic control mechanism operable to disengage the hydraulic clutch to start a change-speed operation or to engage the hydraulic clutch to complete the change-speed operation.

2. Description of the Prior Art

A typical prior construction for controlling a hydraulic clutch for a change-speed operation is known from e.g. a Japanese patent laid open under No. 62-52247. A hydraulic control mechanism of this construction includes a plurality of logic valves disposed in oil passages extending to the hydraulic clutch, the logic valves being controlled by pilot pressures, and valve units provided for hydraulic actuators corresponding to the logic valves and also for a change-speed manual control device, respectively, such that the hydraulic clutch is engaged or disengaged in accordance with opening or closing actions of the logic valves associated with the valve units.

In the above construction, each of the actuators comprises a hydraulic cylinder type actuator whereas the pilot pressure controlling valve unit associated therewith is constructed by forming predetermined lands, oil passages or the like between a piston and cylinder of the actuator.

Further, the above conventional construction uses the further pilot pressure controlling valve unit for the manual control change-speed device, which valve unit is of a spool type for example.

In short, the conventional construction requires numerous logic valves which number corresponds to the number of shifting units and the associated valve units each of which must be slided for an amount corresponding to a shifting amount needed for a desired change-speed operation. The first drawback of this construction is the difficulty of manufacturing such valve units as mentioned immediately above which require a considerable manufacturing precision. The second drawback is the numerous number of components which is disadvantageous in terms of manufacturing costs and efficiency. In these respects, the conventional construction has much room for improvement.

Taking the above state of the art into consideration, the primary object of the present invention is to provide an improved change-speed construction through maximum simplification and rationalization of its hydraulic control mechanism to engage or disengage the hydraulic clutch for a change-speed operation.

SUMMARY OF THE INVENTION

For accomplishing the above-noted object, a change-speed control construction of the invention comprises: a hydraulic clutch disposed in a propelling transmission system; and a hydraulic control mechanism for disengaging the hydraulic clutch to start a change-speed operation and for engaging the hydraulic clutch to complete a change-speed operation; the hydraulic control mechanism including, a selector valve disposed in an oil passage extending to the hydraulic clutch, the selector valve being controlled by a pilot pressure to selectively engage and disengage the hydraulic clutch, and check valve means for switching over the pilot pressure to the selector valve to engage or disengage the hydraulic clutch in accordance with a change-speed operation.

In the above construction, the hydraulic control mechanism includes one pilot pressure controlled selector valve which is disposed immediately before the clutch so as to selectively engage or disengage the clutch and the check valve means for varying the pilot pressure to the selector valve so as to enable the selector valve to selectively engage or disengage the clutch.

In operation, when a change-speed operation using the hydraulic clutch is initiated, the check valve means is operated to vary the pilot pressure to the selector valve for clutch disengagement, with which pilot pressure the slector valve operates to disengage the clutch. On the other hand, when the change-speed operation is completed, the check valve means is operated to vary the pilot pressure for clutch engagement, with which pilot pressure the selector valve operates to engage the clutch.

That is to say, according to the invention's construction, for a change-speed operation the hydraulic clutch is engaged or disengaged in accordance with a pilot pressure to the one selector valve selectively provided by the check valve means which is opened or closed depending on the kind of the change-speed operation.

This improved construction essentially comprises the singular pilot pressure controlled selector valve in the place of a plurality of the logic valves which used to be provided for the number corresponding to the shifting units in the conventional construction and the check valves means consisting of a number of check valves corresponding to the shifting units, each check valve being operable with a sliding motion of the corresponding shifting unit. The first advantage of this improved construction is the simplicity of the entire construction of the hydraulic control mechanism. The second advantage lies with the use of the check valves for controlling the pilot pressure. These check valves can be constructed very easily and economically by using e.g. a ball member. That is, the check valve does not require strict manufacturing precision and is much simpler, easier to assemble and more compact than the spool type valve unit used in the prior art.

Further, according to one preferred embodiment of the present invention, the change-speed operation is carried out by hydraulic actuator means for selectively actuating change-speed units of the propelling transmission system and the hydraulic control mechanism further includes a valve mechanism for controlling the pilot pressure to the selector valve in connection with an operation of a change-speed control valve for controlling the hydraulic actuator means in order to start the selector valve operation prior to the activation of the hydraulic actuator means.

The above valve mechanism can operate with an operation of the change-speed control valve and this valve mechanism directly operates the selector valve for clutch disengagement. Considering timing relationship between an operation of the hydraulic actuator and a disengaging operation of the hydraulic clutch, in the conventional construction, only after approximate completion of the hydraulic actuator operation, the logic valve of the clutch is selectively operated via the valve unit attached to the actuator. That is, the declutching operation takes place in a delayed timing relative to the actuator operation. This is undesirable since a change-speed operation should ideally take place under complete breach of transmission. With view to this problem, according to the above-described construction of the invention, the valve mechanism is provided in operative connection with the change-speed control valve, such that the selector valve can be operated for clutch disengagement prior to the switching operation of the hydraulic actuator means. Therefore, the disadvantageous transmission delay can be minimized.

Further and other objects, features and effects of the invention will become apparent from the following more detailed description of the embodiments of the invention with reference to the accompanying drawings.

BRIEF DESCRIPTION OF THE DRAWINGS

Accompanying drawings illustrate a change-speed control construction relating to one preferred embodiment of the present invention; in which, FIG. 9 is a section view of a hydraulic cylinder for an auxiliary change-speed unit.

DESCRIPTION OF THE PREFERRED EMBODIMENTS

Preferred embodiments of the invention will be particularly described hereinafter with reference to the accompanying drawings.

Figure 1:
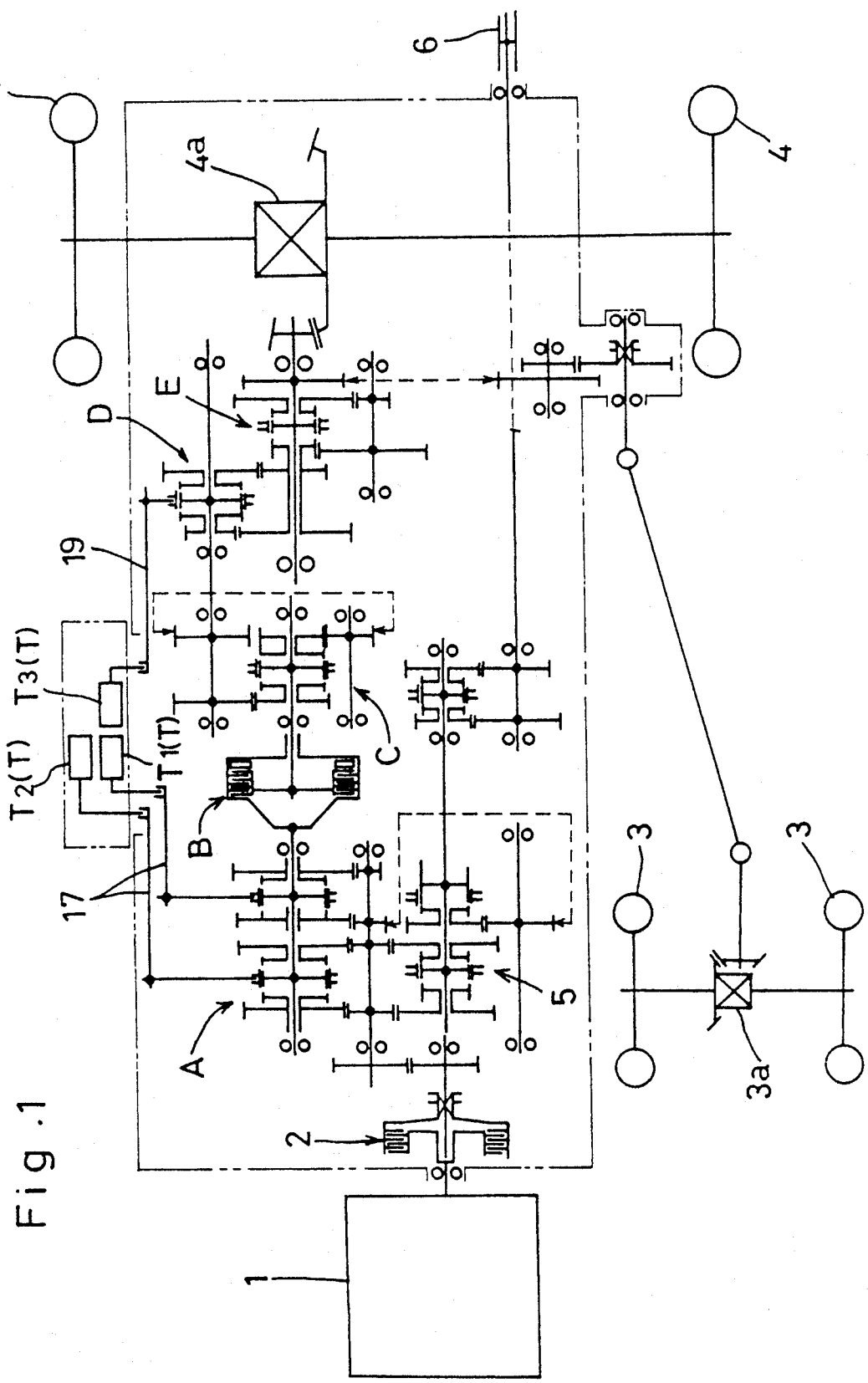
FIG. 1 is a diagram showing a transmission system.

FIG. 1 is a schematic diagram of a transmission system for use in e.g. a four-wheel-drive agricultural tractor. As shown, this transmission system consists essentially of a propelling transmission subsystem and a power takeoff transmission subsystem. The propelling transmission subsystem transmits power from an engine 1 via a multi-plate type main clutch 2 to a main change-speed unit A, a multi-plate type hydraulic clutch B, a forward-reverse switchover unit C and to an auxiliary change-speed unit D in the mentioned order, such that the engine power is transmitted in varied speeds to differential units 3a and 4a for front propelling wheels 3 and rear propelling wheels 4 of the tractor vehicle. The power takeoff transmission subsystem transmits part of the engine power branched by the main clutch 2 through a change-speed unit 5 to a power takeoff shaft 6.

The main change-speed unit A is comprised of a pair of synchoromeshed gear mechanisms operable together to provide four speeds. The forward-reverse switchover unit C and the auxiliary change-speed unit D also are comprised of synchromeshed gear mechanisms. The main change-speed unit A is operated by first and second hydraulic cylinders T1 and T2. The auxiliary change-speed unit D is operated by a third hydraulic cylinder T3. The forward-reverse switchover unit C is operated manually by a manual control lever assembly. Now, the first through third hydraulic cylinders T1, T2 and T3 will be generically referred to hereinafter as a hydraulic actuator means T; whereas, the manual control lever assembly for manually operating the forward-reverse switchover unit C will be referred to as a mechanical control mechanism ML hereinafter. This agricultural tractor further includes a hydraulic control mechanism for selectively disengaging and engaging the hydraulic clutch B to start and complete one of the above-described three types of change-speed operations in such a manner that the change-speed operation can be effected without disengaging the main clutch 2. The construction of this hydraulic mechanism will be particularly described next with reference to FIG. 2 which is a schematic diagram of a hydraulic circuitry used in the mechanism.

As shown, this hydraulic control mechanism includes a pump 7, an oil passage 8 for feeding oil from the pump 7 to the hydraulic clutch B, and a pressure control mechanism F and a pilot pressure controlled selector valve 9 both disposed in the oil passage 8. The mechanism further includes a rotary type change-speed control valve 10 for controlling the three hydraulic cylinders T1, T2 and T3 and a pilot oil passage 11 branched via a needle valve from the oil passage 8 to obtain a pilot pressure for controlling the selector valve 9.

The pressure control mechanism F is used for obtaining clutching pressure with predetermined rising characteristics by appropriately restricting a sharp and violent surge in the pressure when the selector valve 9 is operated for clutch engagement.

Each of the hydraulic cylinders T1, T2 and T3 and of the mechanical control mechanism ML for the forward-reverse switchover unit C is operatively connected with a check valve 12 . . . , together constituting opening/-closing type check valve means. These check valves 12 are provided in an exhaust oil passage 11a branching from the pilot oil passage 11 for the selector valve 9. Accordingly, for a change-speed operation, the check valves 12 are opened or closed to vary the pilot pressure to the selector valve 9 thereby to engage or disengage the hydraulic clutch B.

Describing more specifically, the check valves 12 are opened or closed depending on whether the control system is currently in the course of a change-speed operation or not. Namely, if the system is in a speed changing state, the check valves 12 are opened to communicate the pilot oil passage 11 with an oil tank t, such that the pilot pressure in the passage 11 is lost thereby to disengage the hydraulic clutch B. Conversely, if the system is in a steady state, the check valves 12 remain closed thereby to maintain the clutch engaging pilot pressure in the pilot oil passage 11, such that the hydraulic clutch B is engaged.

Figure 2:
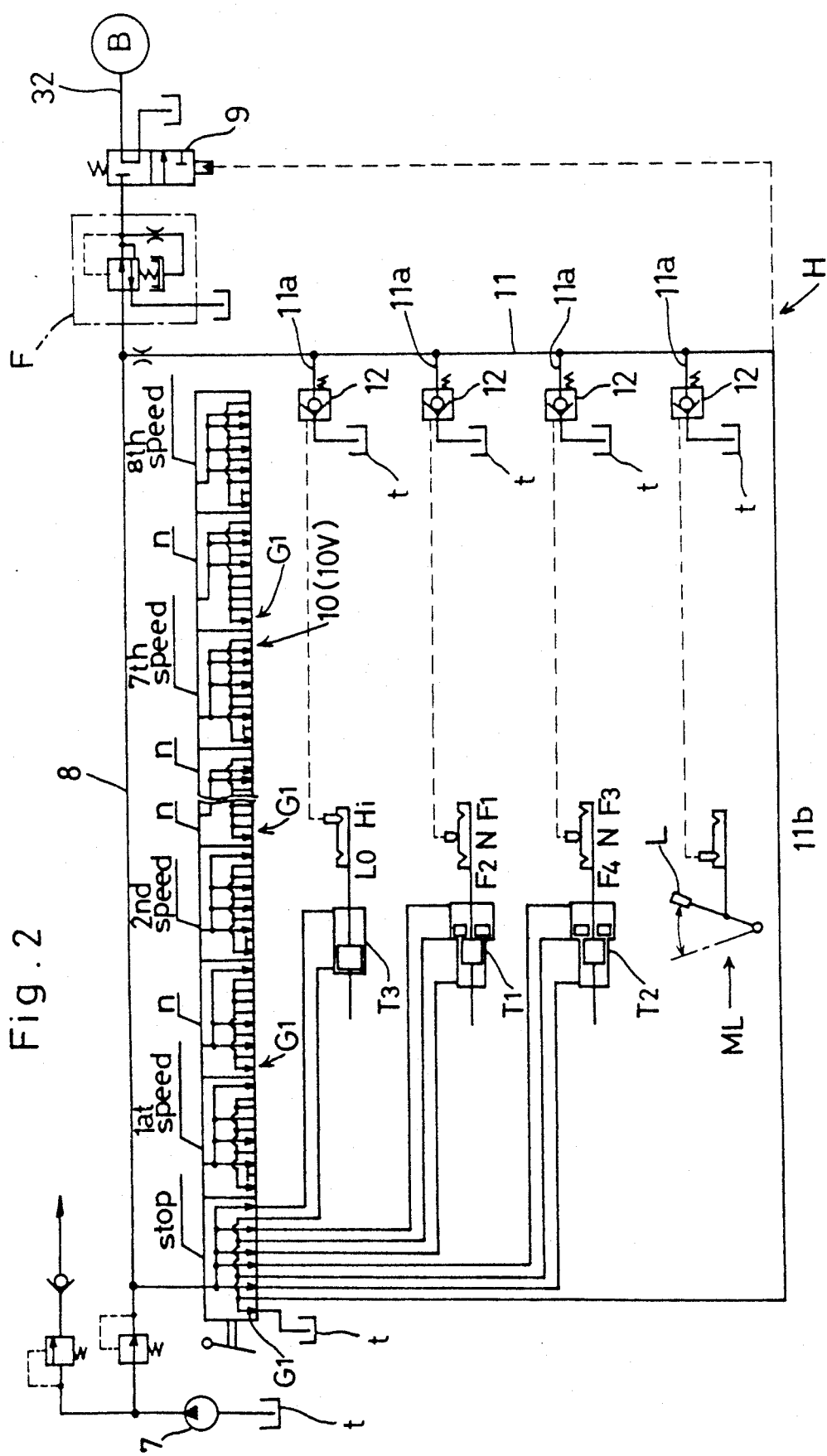
FIG. 2 is a diagram of a hydraulic circuitry used in the change-speed construction.

Moreover, in this change-speed control construction, as also shown in FIG. 2, the change-speed control valve 10 includes, at respective intermediate portions between adjacent speed positions, neutral positions n adapted for allowing the pilot pressure in the oil passage 11 to escape to the oil tank t in the respective positions thereof. With this, pilot pressure reduction needed for clutch disengagement can be obtained prior to the operations of the hydraulic cylinders T1, T2 and T3. In this sense, the change-speed control valve 10 doubles as a pilot pressure control valve mechanism 10V for controlling the pilot pressure to the selector valve 9.

More particularly, the respective portions of the valve mechanism 10V corresponding to a stop position and to the neutral positions n communicate the oil passages 11b with oil passage G1 exetending to the oil tank t, thereby allowing the pilot pressure of the pilot oil passage 11 to escape via this valve mechanism 10V to the oil tank t. That is, these neutral positions n are temporarily used in the course of a change-speed operation so as to communicate the pilot oil passage 11 with the tank t thereby to disengage the hydraulic clutch B prior to the operations of the hydraulic cylinders T1, T2 and T3. The above-described control system will be generically referred to as a hydraulic control mechanism H. The specific construction of the check valves 12 will be described next with reference to FIGS. 3 through 9.

Figure 3:
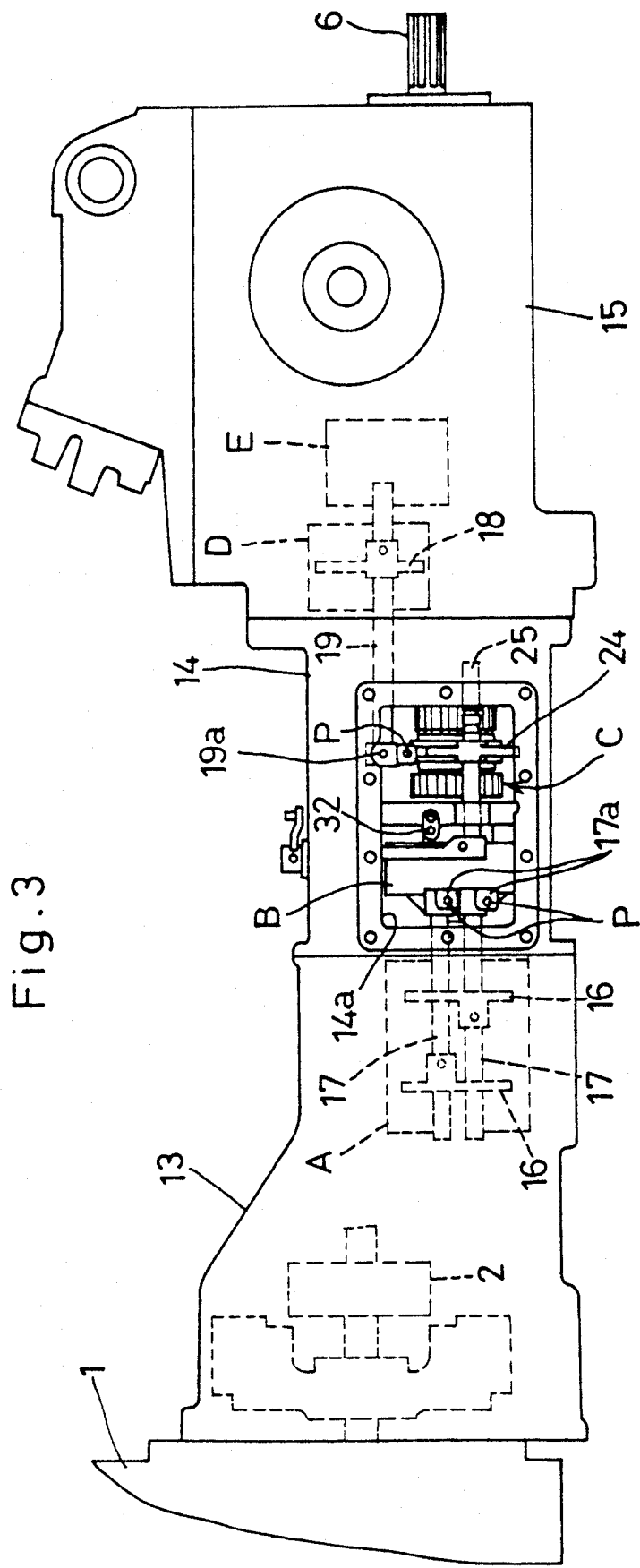
FIG. 3 is a side view of a transmission casing.

As shown in FIG. 3, this transmission system of the agricultural tractor is accommodated in a transmission casing including a main clutch case 13, a middle case 14 and a rear case 15 connected in series with each other. The main clutch case 13 houses the main clutch 2 and the main change-speed unit A. The middle case 14 houses the forward-reverse switchover unit C. And, the rear case 15 houses the auxiliary change-speed unit D and a super reducing unit E.

Figure 4:
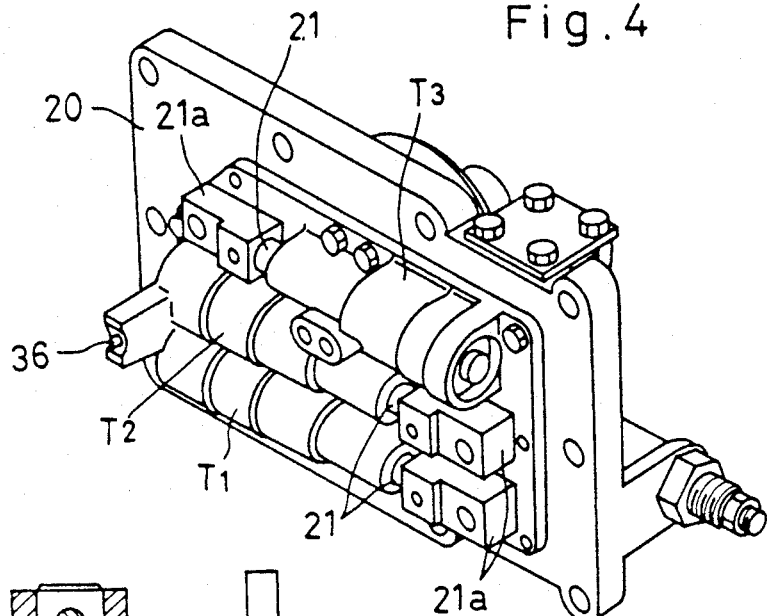
FIG. 4 is a perspective view showing hydraulic cylinders, a lid member and others.
Figure 5:
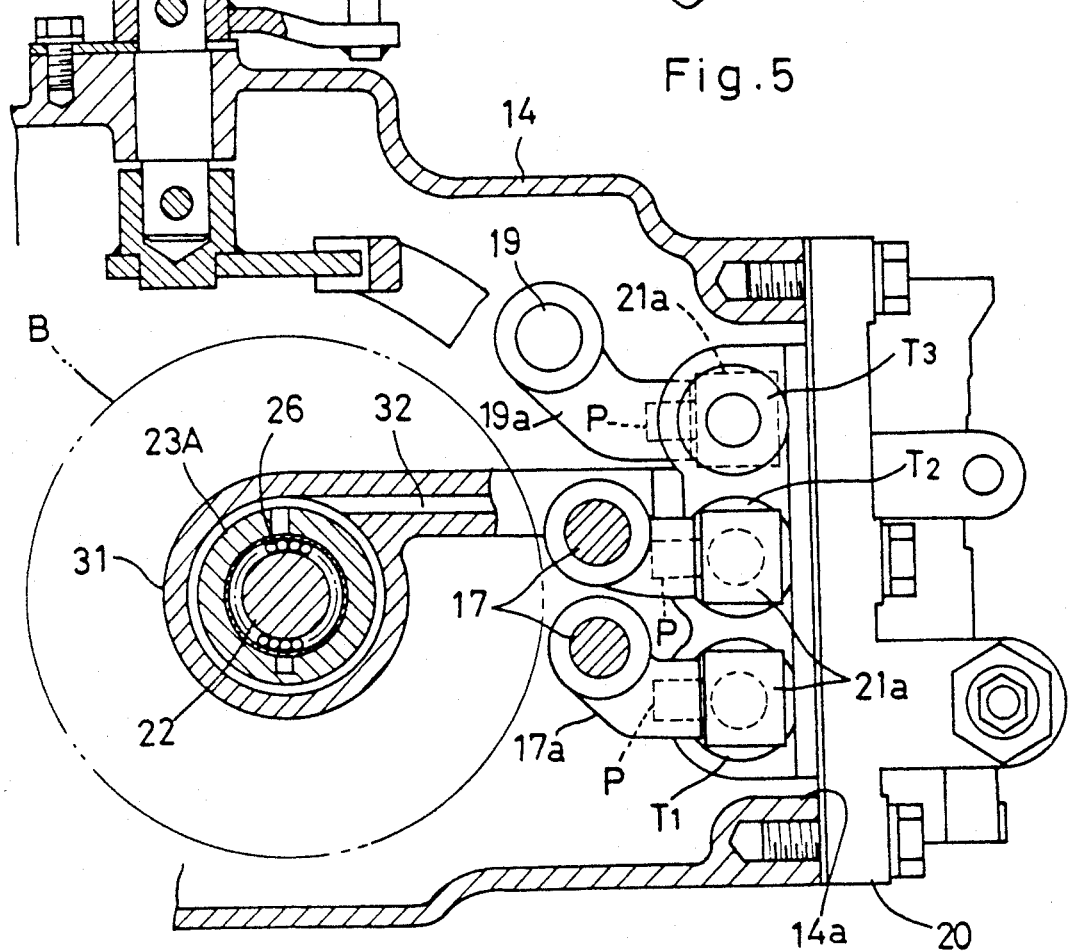
FIG. 5 is a section view showing the transmission casing, the lid member and others.

As shown also in FIG. 3, the middle case 14 defines an opening 14a for exposing a lateral side of the hydraulic clutch B. Into the inner space defined by this opening 14a, ends of shift rods 17, 17 connected with a pair of shifters 16, 16 for main change-speed operations and an end of a futher shift rod 19 connected with a shifter 18 for auxiliary change-speed operations are extended. On the other hand, as shown in FIGS. 4 and 5, the three hydraulic cylinders T1, T2 and T3 are attached to an inner side of a lid member 20 for closing the opening 14a so that the cylinders T1 through T3 can operate the extending ends of the rods 17, 17 and 19. More particularly, brackets 21a, 21a and 21a attached on ends of pistons 21, 21 and 21 of the hydraulic cylinders T1, T2 and T3 are connected via pins P, P and P with brackets 17a, 17a and 19a attached on ends of the shift rods 17, 17 and 19.

Whereas, a further shift rod 25 operatively connected with a forward-reverse switchover shifter 24 is linked with a manual control lever L which constitutes the aforementioned mechanical control mechanism ML.

Figure 6:
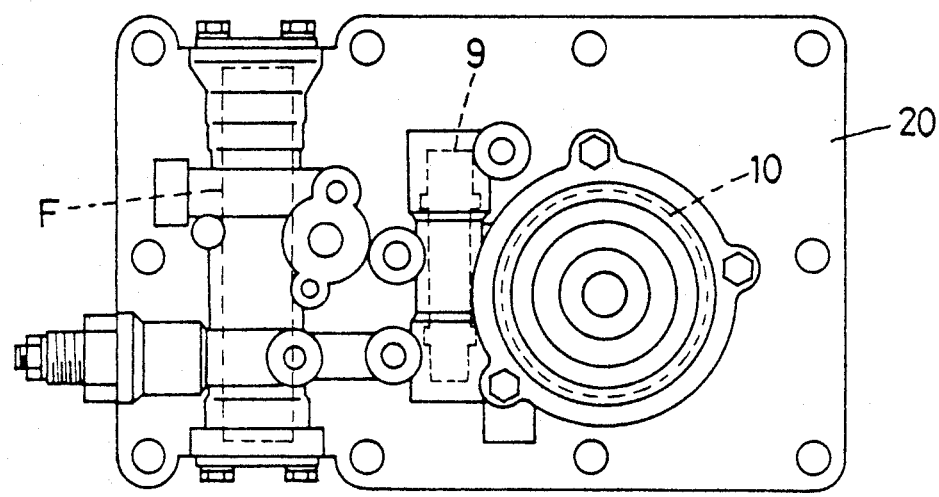
FIG. 6 is a side view showing a change-speed control valve, the lid member and others as viewed from the outside of the transmission casing.

As shown in FIG. 6, the pressure control mechanism F, the selector valve 9, the change-speed control valve 10 and so on are attached on an outer side of the lid member 20. If the transmission system is constructed as the so-called manual change-speed type which does not utilize hydraulic pressure for effecting a change-speed operation, the middle case will dispense with the opening 14a.

Figure 7:
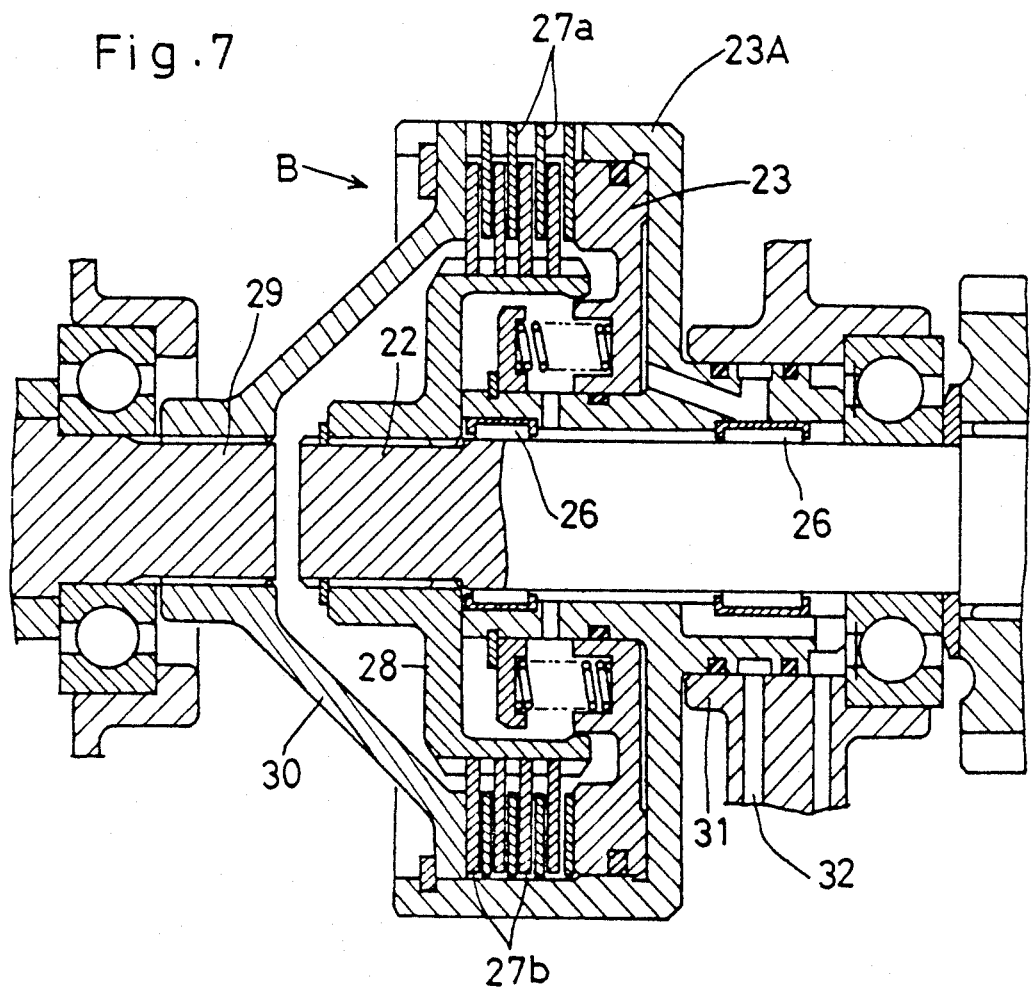
FIG. 7 is a section view of a hydraulic clutch.

Referring now to FIGS. 5 and 7, in the hydraulic clutch B, an input shaft 22 of the forward-reverse switchover unit C loosely mounts thereon via needle bearings 26, 26 a clutch case 23A including a hydraulic piston 23 and a plurality of friction plates 27a, .... This input shaft 22 further mounts, through a spline construction, a holder 28 for supporting a plurality of friction plates 27b, ... disposed alternately between the friction plates 27a of the clutch case 23A. The clutch casing 23A is engaged with a transmission member 30 splined on an output shaft 29 of the main change-speed unit A. Further, between the selector valve 9 attached to the lid member 20 and a joint portion 31 outwardly engaging on a small diameter portion of the clutch case 23A, there is formed a substantially straight oil passage 32 for controlling the hydraulic clutch B.

Figure 8:
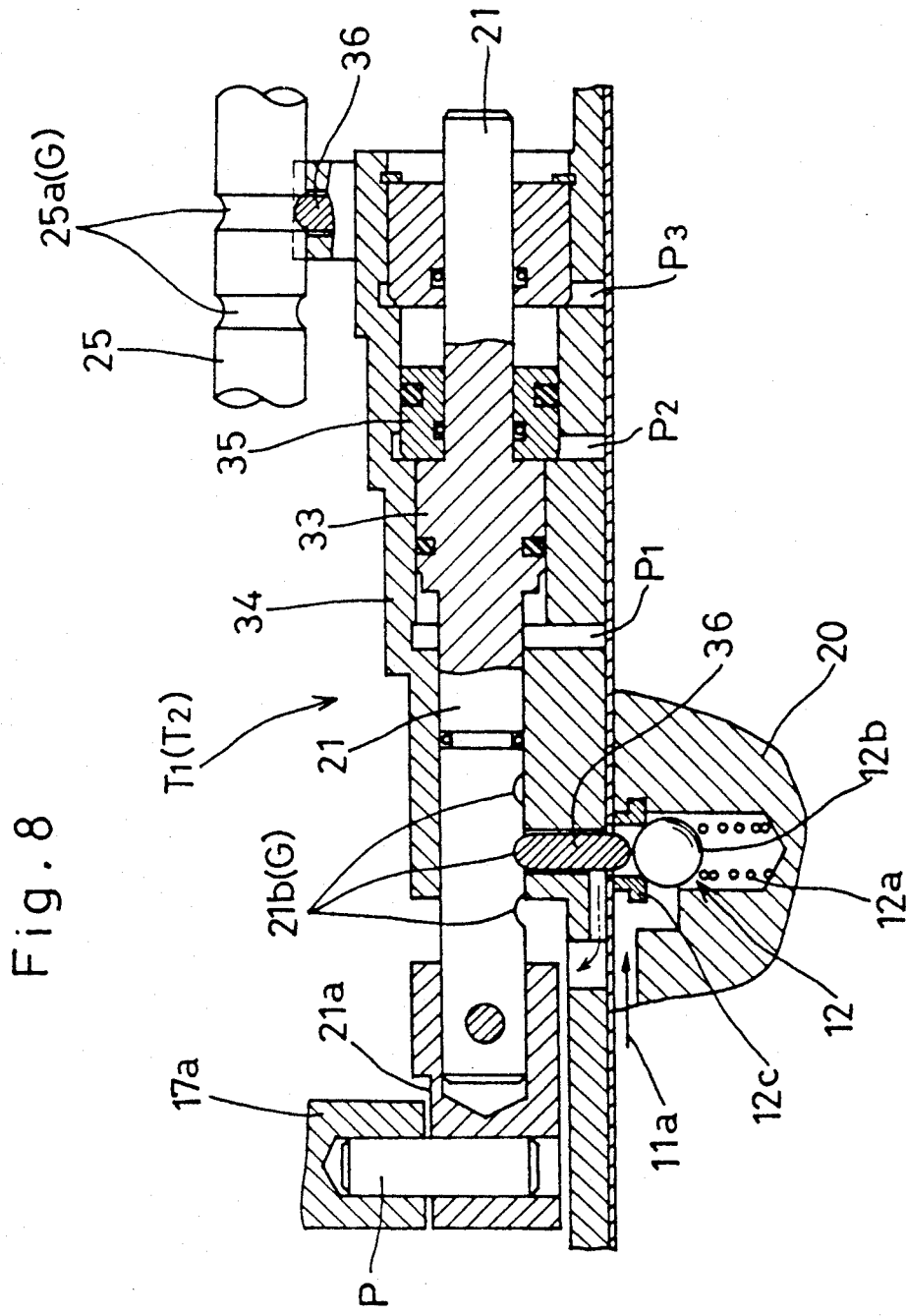
FIG. 8 is a section view of a hydraulic cylinder for a main change-speed unit.

FIG. 8 shows the identical construction of the two hydraulic cylinders T1 and T2 for the main change-speed operations. As shown, the hydraulic cylinder T1 (T2) includes a piston portion 33 having an opposed pair of piston rods 21, 21, a cylinder portion 34 accommodating the piston portion 33 and a movable piston portion 35 slidable on the one piston rod 21 inside the cylinder portion 34. In operation, by feeding oil to opposed end ports P1 and P3 of three ports P1, P2 and P3, the movable piston portion 35 comes into abutment against a stepped part of the cylinder portion 34 and at the same time the piston portion 33 comes into abutment against this movable piston portion 35. This is the neutral position.

Further, the piston rod 21, acting as an operative member of the hydraulic cylinders T1 and T2, defines a cam face G consisting of three recesses 21b, 21b and 21b. On the other hand, a rod type control element 36 which selectively comes into one of the recesses 21b of the cam face G is extended into the interior of the lid member 20 which interior accommodates the check valve 12 consisting of a spring 12a, a ball 12b and a ring holder 12c. The other hydraulic cylinder T3 for the auxiliary change-speed operations does not require a neutral position. Accordingly, as illustrated in FIG. 9, in this hydraulic cylinder T3, similar to the hydraulic cylinders T1 and T2, there are provided a piston portion 33 having an opposed pair of piston rods 21, 21 and a cylinder portion 34. This cylinder portion 34, unlike its equivalent of the cylinders T1 and T2, includes the piston portion 33 only and, this time, two ports P1 and P3 instead of the three ports P1, P2 and P3 of the cylinders T1 and T2.

Further, like the cylinders T1 and T2, the piston rod 21 of this hydraulic cylinder T3 also defines a cam face G consisting, this time, of two recesses 21b and 21b, which cam face is operatively linked with a check valve 12 having the same construction as described above. Further, as shown in FIG. 4, the three hydraulic cylinders T1, T2 and T3 are mounted in a horizontal and vertical alignment on the inner side of the lid member 20, with the forward-reverse switchover shift rod 25 being disposed between the lower two cylinders T2 and T1. Further, as shown in FIG. 8, the shift rod 25 also defines a cam face G consisting of a pair of recesses 25a and 25a, and a control element 36, which comes into contact with the cam face G, extends between the hydraulic cylinders T2 and T1 to be operatively linked with the check valve 12.

These check valves 12 all have the construction identical with that shown in FIG. 8. That is, when being depressed by the control element 36, the ball 12a opens the exhaust oil passage 11a communicating with the pilot oil passage 11 thereby to allow the pilot pressure in the pilot oil passage 11 to escape to the oil tank t.

In the foregoing embodiment, the control element 36 is formed as a rod element. Instead, the specific configuration of this control element 36 can be varied conveniently. Also, the check valve can be constructed as a poppet valve intead of the ball-using check valve employed in the foregoing embodiment.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A change-speed control construction comprising:
   a hydraulic clutch disposed in a propelling transmission system; and
   a hydraulic control mechanism for disengaging the hydraulic clutch to start a change-speed operation and for engaging the hydraulic clutch to complete a change-speed operation;
   the hydraulic control mechanism including,
   a selector valve disposed in an oil passage extending to the hydraulic clutch, the selector valve being controlled by a pilot pressure to selectively engage and disengage the hydraulic clutch, and
   check valve means for switching over the pilot pressure to the selector valve for engaging or disengaging the hydraulic clutch in accordance with a change-speed operation.

2. A change-speed control construction as defined in claim 1, wherein said check valve means is disposed in an exhaust oil passage for opening a pilot oil passage for said selector valve, said check valve means being maintained closed to keep the pilot pressure active so as to keep the clutch engaged when said propelling transmission system is a steady state, said check valve means being maintained open to keep the pilot pressure inactive so as to disengage the clutch.

3. A change-speed control construction as defined in claim 1, wherein said change-speed operation is effected by hydraulic actuator means for switching over a change-speed unit of a propelling transmission system.

4. A change-speed control construction as defined in claim 1, wherein said change-speed operation is effected by a mechanical control mechanism for switching over a change-speed unit of a propelling transmission system.

5. A change-speed control construction as defined in claim 1, wherein a pilot oil passage for said selector valve is branched from said oil passage, with said pilot oil passage receiving oil from said oil passage through a needle valve.

6. A change-speed control construction as defined in claim 3, wherein said hydraulic actuator means includes an operative member defining a cam face cooperative with a control element coming into contact with said cam face, said check valve being opened and closed with displacement of said control element.

7. A change-speed control construction as defined in claim 4, wherein mechanical control mechanism includes an operative member defining a cam face cooperative with a control element coming into contact with said cam face, said check valve being opened and closed with displacement of said control element.

8. A change-speed control construction as defined in claim 2, wherein said propelling transmission system includes a main change-speed unit, an auxiliary change-speed unit and a forward-reverse switchover unit, said hydraulic actuator means including first through third hydraulic cylinders, said mechanical control mechanism including a manual control lever, said main change-speed unit being operated by said first and second hydraulic cylinders, said auxiliary change-speed unit being operated by said third hydraulic cylinder, said forward-reverse switchover unit being operated by said manual control lever, said check valve being opened or closed in connection with operational conditions of said first through third hydraulic cylinders and said manual control lever.

9. A change-speed control construction as defined in claim 8, wherein a pilot oil passage for said selector valve is branched from said oil passage, with said pilot oil passage receiving oil from said oil passage through a needle valve.

10. A change-speed control construction as defined in claim 3, wherein said hydraulic control mechanism includes a valve mechanism for controlling a pilot pressure to said selector valve in connection with an operation of a change-speed control valve for controlling said hydraulic actuator means so as to start the operation of said selector valve prior to a start operation of said hydraulic actuator means.

11. A change-speed control construction as defined in claim 10, wherein said valve mechanism temporarily opens said pilot oil passage when said change-speed control valve is operated for a change-speed operation.

* * * * *